US007485227B2

(12) United States Patent
Kiefer et al.

(10) Patent No.: US 7,485,227 B2
(45) Date of Patent: Feb. 3, 2009

(54) POLYAZOLE-BASED POLYMER FILMS (75) Inventors: Joachim Kiefer, Losheim am See (DE); Oemer Uensal, Mainz (DE); Jochen Baurmeister, Eppstein (DE); Frauke Jordt, Eppstein (DE)

(73) Assignee: BASF Fuel Cell GmbH, Frankfurt am Main (DE)

( * ) Notice: Subject to any disclaimer, the term of this patent is extended or adjusted under 35 U.S.C. 154(b) by 0 days.

(21) Appl. No.: 11/512,803

(22) Filed: Aug. 30, 2006

(65) Prior Publication Data
US 2007/0102361 A1 May 10, 2007

Related U.S. Application Data (63) Continuation of application No. 10/481,170, filed as application No. PCT/EP02/06773 on Jun. 19, 2002, now abandoned.

(30) Foreign Application Priority Data
Jun. 19, 2001 (DE) .................. 101 29 458

(51) Int. Cl.
*B01D 39/00* (2006.01)
*B01D 39/14* (2006.01)
*B29C 65/00* (2006.01)
*H01M 9/10* (2006.01)

(52) U.S. Cl. .............. 210/500.39; 210/500.27; 264/41; 521/27; 521/33; 521/64; 429/29; 429/33

(58) Field of Classification Search .......... 210/500.39, 210/650, 651, 500.38, 500.27, 321.89, 186, 210/500.23; 528/342, 208, 331; 521/64–88, 521/27, 33; 95/45; 429/29, 30, 42, 33, 307; 264/41, 500.41; 524/115
See application file for complete search history.

(56) References Cited

U.S. PATENT DOCUMENTS

| 3,313,783 A | 4/1967 | Iwakura et al. |
| 3,951,920 A | 4/1976 | Senoo et al. |
| 4,087,388 A | 5/1978 | Jensen et al. |
| 4,120,098 A | 10/1978 | Manos |
| 4,259,183 A | 3/1981 | Cadotte |
| 4,483,977 A | 11/1984 | Conciatori et al. |
| 4,628,067 A | 12/1986 | Chen, Sr. et al. |
| 4,690,765 A | 9/1987 | Linder et al. |
| 4,693,824 A | 9/1987 | Sansone |
| 4,693,825 A | 9/1987 | Trouw |
| 4,758,343 A | 7/1988 | Sasaki et al. |

(Continued)

FOREIGN PATENT DOCUMENTS

EP 0 816 415 A2 1/1998

(Continued)

*Primary Examiner*—Ana M Fortuna
(74) *Attorney, Agent, or Firm*—Hamilton, Brook, Smith & Reynolds, P.C.

(57) ABSTRACT

The present invention relates to polymer films and a polymer membrane having an improved mechanical property profile produced therefrom, to a process for producing them and to their use.

The polymer films, polymer membranes and separation membranes of the invention are produced from selected polymer raw materials and have excellent chemical, thermal, and mechanical properties as are required for use as polymer electrolyte membranes (PEMs) in PEM fuel cells or in apparatuses for the filtration and/or separation of gases and/or liquids or for reverse osmosis.

17 Claims, 2 Drawing Sheets

U.S. PATENT DOCUMENTS

| | | | |
|---|---|---|---|
| 4,761,234 A | 8/1988 | Uemura et al. | |
| 4,814,399 A | 3/1989 | Sansone et al. | |
| 4,814,530 A | 3/1989 | Ward et al. | |
| 4,933,083 A | 6/1990 | Jones, Jr. | |
| 5,043,113 A | 8/1991 | Kafchinski et al. | |
| 5,091,087 A | 2/1992 | Calundann et al. | |
| 5,147,895 A | 9/1992 | Hughes et al. | |
| 5,169,871 A | 12/1992 | Hughes et al. | |
| 5,247,010 A | 9/1993 | Hughes et al. | |
| 5,262,056 A | 11/1993 | Koros et al. | |
| 5,286,324 A | 2/1994 | Kawai et al. | |
| 5,304,307 A | 4/1994 | Linder et al. | |
| 5,525,436 A | 6/1996 | Savinell et al. | |
| 6,623,634 B1 | 9/2003 | Whitehurst | |
| 6,623,639 B2 * | 9/2003 | Barss et al. | 210/500.23 |
| 6,767,664 B2 | 7/2004 | Akita et al. | |
| 6,770,202 B1 | 8/2004 | Kidd et al. | |
| 6,790,553 B1 | 9/2004 | Yamamoto | |
| 6,794,480 B2 | 9/2004 | Goto et al. | |
| 6,864,006 B2 | 3/2005 | Honma et al. | |
| 6,878,475 B2 | 4/2005 | Wixom et al. | |
| 6,946,015 B2 | 9/2005 | Jorgensen et al. | |
| 6,946,211 B1 | 9/2005 | Bjerrum et al. | |
| 6,986,844 B2 | 1/2006 | Barss et al. | |
| 6,997,971 B1 | 2/2006 | Young et al. | |
| 7,229,553 B2 * | 6/2007 | Uensal et al. | 210/500.28 |
| 7,235,320 B2 * | 6/2007 | Calundann et al. | 429/30 |
| 7,285,325 B2 * | 10/2007 | Soczka-Guth et al. | 428/220 |
| 7,332,530 B2 * | 2/2008 | Kiefer et al. | 521/27 |
| 7,384,552 B2 * | 6/2008 | Calundann et al. | 210/500.38 |

FOREIGN PATENT DOCUMENTS

| | | |
|---|---|---|
| EP | 0 816 415 A3 | 2/1998 |

* cited by examiner

POLYAZOLE-BASED POLYMER FILMS

RELATED APPLICATION(S)

This application is a continuation of U.S. application Ser. No. 10/481,170, filed Aug. 5, 2004 now abandoned, which is the U.S. National Phase of International Application. No. PCT/EPO2/06773, filed Jun. 19, 2002, published in German, which application claims priority under 35 U.S.C. § 119 or 365 to German Application No. 101 29 458.1, filed Jun. 19, 2001. The entire teachings of the above applications are incorporated herein by reference.

BACKGROUND OF THE INVENTION

The present invention relates to polymer films and a polymer membrane having an improved mechanical property profile produced therefrom, to a process for producing them and to their use.

Owing to its excellent chemical, thermal arid mechanical properties, the acid-doped polymer membrane described below can be used in a wide variety of applications and is suitable, in particular, as polymer electrolyte membrane (PEM) in PEM fuel cells.

Acid-doped polyazole membranes for use in PEM fuel cells are known. The basic polyazole membranes are doped with concentrated phosphoric acid or sulfuric acid and act as proton conductors and separators in polymer electrolyte membrane fuel cells (PEM fuel cells).

For this application, electrodes coated with catalyst are applied to both sides of the acid-doped polyazole membranes to form a membrane-electrode unit (MEE). A plurality of such membrane electrode units are then connected in series together with bipolar plates and form the fuel cell stack.

As a result of the series construction, the cell voltage and power of the stack depends on the number of membrane-electrode units. Furthermore, failure of a single one of these membrane-electrode units results in a break in the circuit and thus failure of the entire fuel cell. For this reason, extraordinarily high quality demands are made on the mechanical stability of all components. The thin, usually 100 μm thick polymer membrane in particular is frequently regarded as the weakest link in this chain. The membrane performs two essential tasks. Firstly, it has to have a high proton conductivity in order to be able to conduct the protons formed in the oxidation of a hydrogen-rich fuel at the anode to the cathode. There, reduction with oxygen, preferably from air, then takes place with formation of water. Secondly, the membrane functions as a separator and should have a very low permeability to the fuels present. In particular, when hydrogen and oxygen are used, mixing of the two gases has to be prevented. For this reason, the polymer membrane should not fail in operation, even at high temperatures.

The mechanical stability of the thin (usually <0.2 mm) polymer film is reduced by the doping with acid to generate a high proton conductivity. To be able to withstand the stressing of the cells at operating temperatures of >100° C. over the long term, extremely resistant polymers have to be used.

Due to the excellent properties of the polyazole polymer, polymer electrolyte membranes based on polyazoles, converted into membrane-electrode units (MEE), can be used in fuel cells at long-term operating temperatures above 100° C., in particular above 120° C. This high long-term operating temperature allows the activity of the catalysts based on noble metals which are present in the membrane-electrode unit (MEE) to be increased. Particularly when using reformer products produced from hydrocarbons, significant amounts of carbon monoxide are present in the reformer gas and these usually have to be removed by means of a costly gas work-up or gas purification. The ability to increase the operating temperature enables significantly higher concentrations of CO impurities to be tolerated over the long term.

The use of polymer electrolyte membranes based on polyazole polymers allows, firstly, the costly gas work-up or gas purification to be partly omitted and, secondly, the amount of catalyst in the membrane-electrode unit to be reduced, They are indispensable prerequisites for wide use of PEM fuel cells, since otherwise the costs of a PEM fuel cells system are too high.

The acid-doped polyazole-based polymer membranes known hitherto display a favorable property profile. However, owing to the applications sought for PEM fuel cells, especially in the automobile and stationary sector, these need to be improved overall.

Thus, the polyazole-based polymer membranes known hitherto display mechanical properties after doping with acid which are still unsatisfactory for the above application. This mechanical instability is shown by a low modulus of elasticity, a low ultimate tensile strength and a low fracture toughness.

SUMMARY OF THE INVENTION

The present invention relates to polymer films and a polymer membrane having an improved mechanical property profile produced therefrom, to a process for producing them and to their use.

It is an object of the present invention to provide acid-doped polymer membranes based on polyazoles which have, firstly, improved mechanical properties and, secondly, retain the advantages of polymer membranes based on polyazoles and allow an operating temperature above 100° C. without additional humidification of the fuel gas.

We have now found that polyazole-based polymer films which display a significantly improved mechanical stability after doping with an acid can be obtained when selected polyazole raw materials are used for producing the polymer film.

Owing to its excellent chemical, thermal arid mechanical properties, the acid-doped polymer membrane described below can be used in a wide variety of applications and is suitable, in particular, as polymer electrolyte membrane (PEM) in PEM fuel cells.

DETAILED DESCRIPTION OF THE INVENTION

The present invention accordingly provides a polymer film based on polyazoles which is obtainable by a process comprising steps A) dissolving the polyazole polymer in a polar, aprotic organic solvent, B) casting a polymer film using the solution obtained from step A), C) dying the film formed in step B) until it is self-supporting wherein a polyazole polymer powder having a particle size in the range from 300 pm 20 to 1500 pm is used in step A).

The polyazole polymer powder having a particle size in the range from 300 μm to 1500 μm which is used according to the invention is obtained by sieving a commercially available polyazole polymer. Polyazole polymers, for example those based on polybenzimidazoles, are commercially available products and are sold under the name Celazole®.

The commercially available polyazole (Celazole PBI polymer) is separated into different particle size fractions by sieving. Sieving avoids a complex fractionation as described, for example, in Mat. Res. Soc. Symp. Proc. 548 (1999), pages 313-323.

It has surprisingly been found that the small particles obtained by sieving give a low fracture toughness. This is surprising because small particles have a high ratio of surface area, SA, to volume, V. However, in a process for the polycondensation of polyazoles as employed, for example, for PBI, the degree of polymerization should increase with an increasing SA/V ratio. Targeted selection of the fractions obtained on sieving enables the mechanical properties to be improved significantly.

In a preferred embodiment of the invention, polyazole polymer powders having a particle size in the range from 300 μm to 1250 μm, in particular from 300 μm to 1000 μm, particularly preferably from 500 μm to 1000 μm, are used.

The preparation of polymer solutions based on polyazoles as in step A) has been comprehensively described in the prior art. Thus, EP-A-0816415 describes a process for dissolving polymers based on polyazoles using N,N-dimethylacetamide as polar, aprotic solvent at temperatures above 260° C. A substantially milder process for preparing solutions based on polyazoles is disclosed in the German patent application 10052237.8.

As polymers based on polyazoles, preference is given to using polymers comprising recurring azole units of the formula (I) and/or (II)

(I)

(II)

where

Ar are identical or different and are each a tetravalent aromatic or heteroaromatic group which can be monocyclic or polycyclic, $Ar^1$ are identical or different and are each a divalent aromatic or heteroaromatic group which can be monocyclic or polycyclic, $Ar^2$ are identical or different and are each a trivalent aromatic or heteroaromatic group which can be monocyclic or polycyclic, X are identical or different and are each oxygen, sulfur or an amino group bearing a hydrogen atom, a group having 1-20 carbon atoms, preferably a branched or unbranched alkyl or alkoxy group, or an aryl group as further radical.

Preferred aromatic or heteroaromatics groups are derived from benzene, naphthalene, biphenyl, diphenyl ether, diphenylmethane, diphenyldimethylmethane, bisphenone, diphenyl sulfone, quinoline, pyridine, bipyridine, anthracene and phenanthrene, each of which may also be substituted.

$Ar^1$ can have any substitution pattern; in the case of phenylene, for example, $Ar^1$ can be ortho-, meta- or para-phenylene. Particularly preferred groups are derived from benzene and biphenylene, each of which may also be substituted.

Preferred alkyl groups are short-chain alkyl groups having from 1 to 4 carbon atoms, e.g. methyl, ethyl, n-propyl or isopropyl and t-butyl groups.

Preferred aromatic groups are phenyl or naphthyl groups. The alkyl groups and the aromatic groups may be substituted.

Preferred substituents are halogen atoms such as fluorine, amino groups or short-chain alkyl groups such as methyl or ethyl.

If polyazoles having recurring units of the formula (I) are used for the purposes of the present invention, the radicals X within a recurring unit should be identical.

The polyazoles used according to the invention can in principle also have differing recurring units which, for example, differ in their radical X. However, there are preferably only identical radicals X in a recurring unit.

In a preferred embodiment of the present invention, the polymer comprising recurring azole units is a copolymer comprising at least two units of the formula (I) and/or (II) which differ from one another.

In a particularly preferred embodiment of the present invention, the polymer comprising recurring azole units is a polyazole containing only units of the formula (I) and/or (II).

The number of recurring azole units in the polymer is preferably greater than or equal to 10. Particularly preferred polymers have at least 100 recurring azole units.

For the purposes of the present invention, preference is given to using polymers comprising recurring benzimidazole units. An example of an extremely advantageous polymer comprising recurring benzimidazole units corresponds to the formula (III):

(III)

where n is an integer greater than or equal to 10, preferably greater than or equal to 100.

The casting of a polymer film (step B) from a polymer solution prepared according to step A) is carried out by methods known per se from the prior art.

The drying of the film in step C) is carried out at temperatures ranging from room temperature to 300° C. Drying is carried out under atmospheric pressure or reduced pressure. The drying time depends on the thickness of the film and is in the range from 10 seconds to 24 hours. The film dried as per step C) is subsequently self-supporting and can be processed further. Drying is carried out by drying methods customary in the film industry.

As a result of the drying carried out in step C), the polar, aprotic organic solvent is very largely removed. The residual content of polar, aprotic organic solvent is usually 10-23%.

A further reduction in the residual solvent content to below 2% by weight can be achieved by increasing the drying temperature and drying time, but this significantly prolongs the subsequent doping of the film, for example with phosphoric acid. A residual solvent content of 5-15% is thus advantageous to reduce the doping time.

In one variant, drying can also be combined with a washing step. A particularly mild process for after-treatment and removal of the residual solvent is disclosed in the German patent application 10109829.4.

The polymer films of the invention display a surprisingly high mechanical stability, as shown by a high modulus of elasticity combined with a high tensile strength, a high elongation at break and a high fracture toughness.

The polymer films of the invention display, at a modulus of elasticity of at least 2870 MPa, a fracture toughness of greater than 2300 kJ/m², preferably greater than 2320 kJ/m², and an elongation at break of at least 44%.

The present invention further provides dense or porous polyazole-based separation membranes obtainable by a process comprising the steps A) dissolving the polyazole polymer in a polar, aprotic organic solvent,
B) casting a polymer film using the solution obtained from step A),
C) dipping this film into a precipitation bath wherein a polyazole polymer powder having a particle size in the range from 300 µm to 1500 µm is used in step A).

In these separation membranes too, preference is given to using polyazole polymer powders having a particle size in the range from 300 µm to 1250 µm, in particular from 300 µm to 1000 µm, particularly preferably from 500 µm to 1000 µm.

The preferred polymer structures of the formulae (I) and (II) are also preferred for these separation membranes.

Further information on separation membranes based on polyazoles may be found in the specialist literature, in particular the patents WO 98/14505; U.S. Pat. No. 4,693,815; U.S. Pat. No. 4,693,824; U.S. Pat. No. 3,752,62; U.S. Pat. No. 3,737,042; U.S. Pat. No. 4,512,894; U.S. Pat. No. 4,486,87; U.S. Pat. No. 3,841,492. The disclosure of the abovementioned references in respect of the structure and production of separation membranes is hereby incorporated by reference as part of the present disclosure. In particular, such separation membranes can be produced in the form of flat films or as hollow fiber membranes.

Depending on the desired specification of the separation membrane, the polymer film formed can be dried after step B) before it is introduced into the precipitation bath (step C). Drying allows better handling of the polymer film. In addition, the morphology of the membrane can be adjusted by drying, To enable the polymer film to be handled more readily, the film can be formed on a support in step B). The polymer film formed, which is generally not yet self-supporting, is subsequently introduced into the precipitation bath. In this way it is possible to produce, for example, asymmetric structures.

Apart from the known advantages of separation membranes based on polyazoles, for example high thermal stability and resistance to chemicals, the separation membranes of the invention have improved mechanical properties as a result of a higher molecular weight which lead to increased long-term stability and a longer life and also an improved separation performance.

Such separation membranes can be produced as dense polymer films, porous hollow fiber membranes or as porous, open-celled polymer films, if desired with a compact surplus layer, by dipping into the precipitation bath. The precipitation bath comprises one or more nonsolvents for the polyazole and, if desired, one or more solvents. Nonlimiting examples of nonsolvents for polyazoles are water, acetone, glycols, alcohols, preferably methanol or benzyl alcohol, and also other liquids which are not soluble in water. Nonlimiting examples of solvents for polyazoles are DMAc, NMP, DMF, DMSO and strong acids such as sulfuric acid, methanesulfonic acid or trifluoroacetic acid.

To produce a porous membrane, the polymer solution from step A) can likewise comprise a nonsolvent or pore formers such as glycerol.

In the precipitation in step C), solvent exchange occurs and leads to formation of known porous structures. Different morphologies of the separation membranes can thus be produced by choice of the composition of the precipitant. For separation applications, the following structures are preferred: i) symmetric, porous structure, ii) asymmetric porous structure with a polymer seal close to a membrane surface. Scanning electron micrographs of such particularly suitable structures of a polybenzimidazole membrane are disclosed in Journal of Membrane Science, Volume 20, 1984, pages 147-66.

Such phase inversion membranes and structures are known to those skilled in the art. Membranes having a symmetric porous structure are employed as separation or filtration membranes for filtration of air and gases or the microfiltration or ultrafiltration of liquids. Membranes having an asymmetric porous structure can be used in a variety of reverse osmosis applications, in particular desalination of water, dialysis or purification of gases.

A particularly advantageous application is the separation of hydrogen and carbon dioxide from gas mixtures in combination with a porous metallic support. Alternative technologies for separating off $CO_2$ require, owing to the low thermal stability of the, polymer membrane, cooling of the gas to 150° C., which reduces the efficiency. The polyazole-based separation membranes of the invention can be operated continuously at a temperature up to 400° C. and thus lead to an increase in the yield and a reduction in the costs.

The polymer films of the invention can be made proton-conducting by appropriate 5 doping.

Accordingly, the present invention further provides a doped polymer membrane based on polyazoles which is obtainable by a process comprising the steps A) dissolving the polyazole polymer in a polar, aprotic organic solvent,
B) casting a polymer film using the solution obtained from step A),
C) drying the film formed in step B) until it is self-supporting,
D) doping the polymer film obtained in step C) with a dopant, wherein a polyazole polymer powder having a particle size in the range from 300 µm to 1500 µm is used in step A).

In a preferred embodiment of the invention, polyazole polymer powders having a particle size in the range from 300 µm to 1250 µm, in particular from 300 µm to 1000 µm, particularly preferably from 500 µm to 1000 µm, are used.

The preferred polymer structures of the formulae (I) and (II) are also preferred for this doped polymer membrane.

In step D), the doping of the polymer film obtained in step C) is carried out. For this purpose, the film is wetted with a dopant or is placed in the latter. Dopants used for the polymer membranes of the invention are acids, preferably all known Lewis and Brønsted acids, in particular inorganic Lewis and Brønsted acids. Apart from the acids just mentioned, it is also possible to use polyacids, in particular isopolyacids and heteropolyacids, and mixtures of various acids. For the purposes of the present invention, heteropolyacids are inorganic polyacids which have at least two different central atoms and are formed as partial mixed anhydrides from weak, polybasic oxo acids of a metal (preferably Cr, Mo, V, W) and a nonmetal (preferably as, I, P, Se, Si, Te). They include, inter alia, 12-moiybdophosphoric acid and 12-tungstophosphoric acid.

The polymer film used for the doping step D) can also be a separation membrane a comprising the polyazole according to the invention. Owing to the increased porosity, this leads, as described in WO 98/14505, to a reduction in the doping time, increased acid loading and a further improved conductivity.

According to the invention, particularly preferred dopants are sulfuric acid and phosphoric acid. A very particularly preferred dopant is phosphoric acid ($H_3PO_4$).

The polymer membranes of the invention are doped. For the purposes of the present invention, doped polymer membranes are polymer membranes which as a result of the presence of dopants display increased proton conductivity compared to the undoped polymer membranes.

Methods of producing doped polymer membranes are known. In a preferred embodiment of the present invention, they are obtained by wetting a film of the polymer concerned with concentrated acid, preferably highly concentrated phosphoric acid, for an appropriate time, preferably 5 minutes-96 hours, particularly preferably 1-72 hours, at temperatures in the range from room temperature to 100° C. and atmospheric or superatmospheric pressure.

The conductivity of the polymer membrane of the invention can be influenced via the degree of doping, The conductivity increases with increasing concentration of dopant until a maximum value has been reached. According to the invention, the degree of doping is reported as mol of acid per mol of repeating units of the polymer. For the purposes of the present invention, a degree of doping of from 3 to 15, in particular from 6 to 12, is preferred.

The polymer membrane of the invention has, improved materials properties compared to the previously known doped polymer membranes based on commercially available polyazoles. In particular, they have very good mechanical properties.

Particularly when using polyazole polymer powders having a particle size in the range from 500 μm to 1000 μm, the acid-doped polymer membranes display a significantly improved elongation at break of at least 40%, preferably from 40 to 65%.

Possible applications for the doped polymer membranes of the invention include, inter alia, use in fuel cells, in electrolysis, in capacitors and in battery systems. Owing to their property profile, the doped polymer membranes are preferably used in fuel cells.

The present invention also provides a membrane-electrode unit comprising at least one polymer membrane according to the invention. Further information on membrane-electrode units may be found in the specialist literature, in particular the patents U.S. Pat. No. 4,191,613, U.S. Pat. No. 4,212,714 and U.S. Pat. No. 4,333,805. The disclosure of the abovementioned references [U.S. Pat. No. 4,191,618, U.S. Pat. No. 4,212,714 and U.S. Pat. No. 4,333,805] in respect of the structure and production of membrane-electrode units is hereby incorporated by reference into the present description.

The invention is illustrated below by means of examples and comparative examples, without the invention being restricted to these examples.

EXAMPLES

A commercial polymer (Celazole, PBI polymer) in the form of a powder is separated into various fractions by means of a stack of sieves, The results of the sieve analysis are shown in table 1. The sieve fractions obtained in this way are dried individually. As soon as the water content of a sieve fraction is <0.1%, a solution is prepared therefrom by mixing with dimethylacetamide using a method described in the prior art. It is found that particles having a size of >1500 μm cannot be brought completely into solution. For this reason, particles having a size of >1500 μm should not be used for the preparation of solutions.

Each solution prepared using a separate sieve fraction is then used to produce a film by conventional industrial casting processes or by a manual doctor blade technique. The films produced in this way are doped by dipping into 85% $H_3PO_4$ at room temperature for 72 hours.

Results

TABLE 1

Results of the sieve analysis of a commercial PBI polymer

| Sieve fraction | Proportion (percent by weight) |
| --- | --- |
| <200 μm | 6 |
| 200-300 μm | 15 |
| 300-500 μm | 43 |
| 500-750 μm | 15 |
| 750-1000 μm | 11 |
| 1000-1500 μm | 7 |
| >1500 μm | 3 |

Mechanical Properties of Commercial PBI Films

To determine the mechanical properties, test specimens of type 1B in accordance with ISO 527-3 are stamped from the films and examined by means of a uniaxial tensile test using a Zwick universal testing machine model S100. The deformation rate is 5 mm/min and the test temperature is set to 160° C. so as to correspond to temperatures typical for use in fuel cells. At least 5 tensile tests are carried out on each sample composition and the statistical mean is determined.

Figure 1:
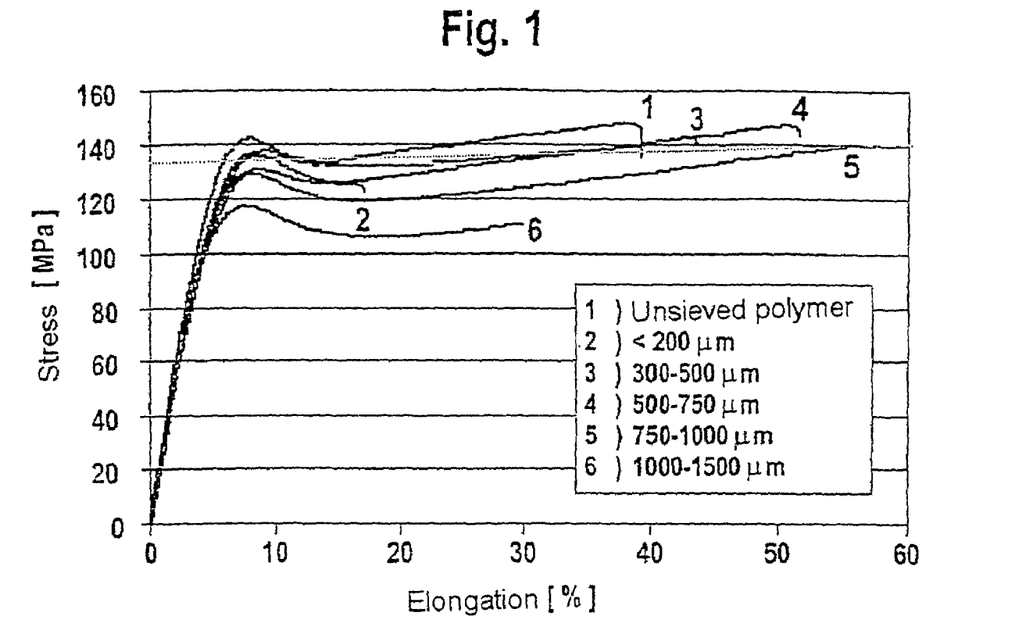
FIG. 1 is a plot showing tensile test curves of film produced from individual sieve fractions as described in Example 1.

Examples of tensile test curves of film produced from individual sieve fractions are shown in FIG. 1. The data obtained in this way are summarized in table 2.

It is found that the fracture toughness depends strongly on the sieve fraction. In particular, high fracture toughness are achieved for films which have been produced using sieve fractions in the range 300-1000 μm.

TABLE 2

Results of the tensile tests on films produced from various sieve fractions

| | Polymer fraction | | | | | |
|---|---|---|---|---|---|---|
| | Unsieved polymer | <200 μm | 300-500 μm | 500-750 μm | 750-1000 μm | 1000-1500 μm |
| Number of measurements | 6 | 5 | 5 | 5 | 5 | 6 |
| Modulus of elasticity [MPa] | 2850 | 2910 | 2870 | 2875 | 2661 | 2780 |
| Tensile strength [MPa] | 147 | 139 | 141 | 148 | 149 | 123 |
| Elongation at break [%] | 42 | 20 | 44 | 49 | 61 | 30 |
| Fracture toughness [kJ/m$^2$] | 2268 | 892 | 2320 | 2528 | 2910 | 1281 |

Mechanical Properties of Acid-doped Membranes

Figure 2:
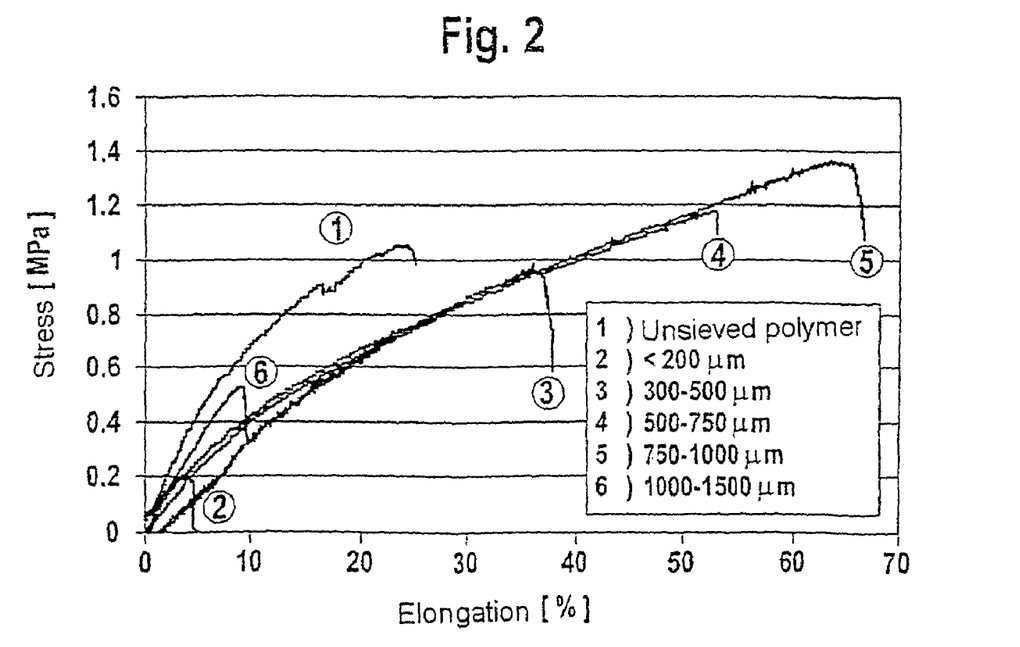
FIG. 2 is a plot showing tensile test curves of film produced after doping with acid Examples of as described in Example 2.

After doping with acid, strip specimens having a width of 15 mm and a length of 120 mm are produced and tested in a tensile test at T=100° C. at an elongation rate of 50 mm/min. Examples of tensile test curves as shown in FIG. 2 and the results of the analysis are summarized in table 3.

The specimens obtained using the sieve fractions <200 μm and 200-300 μm are very unstable mechanically and rupture at very low stresses. Only unsatisfactory mechanical properties were able to be achieved using these fine fractions. As observed in the case of the films, the membranes, too, display the best mechanical properties in the case of materials produced from powders in the range 300-1000 μm. Surprisingly, it is likewise found that the use of particles >1000 μm leads to a worsening of the mechanical properties.

The specific conductivity is measured by means of impedance spectroscopy in a 4-pole arrangement in the potentiostatic mode using platinum electrodes (wire, 0.25 mm diameter). The distance between the current collector electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated via a Pt-100 resistance thermometer positioned in the immediate vicinity of the specimen.

TABLE 3

Results of the tensile tests on acid-doped PBI membranes produced from various sieve fractions

| | Polymer fraction | | | | | | |
|---|---|---|---|---|---|---|---|
| | Unsieved polymer | <200 μm[1] | 200-300 μm[1] | 300-500 μm | 500-750 μm | 750-1000 μm | 1000-1500 μm |
| Number of measurements | 5 | 3 | 5 | 5 | 5 | 5 | 5 |
| Modulus of elasticity [MPa] | 8.2 | 5 | 5.1 | 3 | 5.2 | 4.2 | 5.3 |
| Tensile strength [MPa] | 1.2 | <0.5 | 0.2 | 0.9 | 1.2 | 1.6 | 0.5 |
| Elongation at break [%] | 26 | <5 | 5 | 40 | 48 | 65 | 11 |
| Fracture toughness [kJ/m$^2$] | 21.6 | <1 | 0.6 | 19.4 | 20.5 | 56 | 3.1 |

[1] A number of specimens rupture at even smaller forces and cannot be measured

After the temperature has been reached, the specimen is maintained at this temperature for 10 minutes prior to commencement of the measurement.

It is surprisingly found that, particularly in the temperature range >100° C., membranes produced using the sieve fractions have higher conductivities than a membrane produced using the unsieved polymer.

TABLE 4

Specific conductivity (S/cm) of PBI membranes which have been produced from various sieve fractions and doped with phosphoric acid

| T(° C.) | Unsieved polymer | <200 μm | 200-300 μm | 300-500 μm | 500-750 μm | 750-1000 μm | 1000-1500 μm |
|---|---|---|---|---|---|---|---|
| 25 | 0.053 | 0.073 | 0.051 | 0.049 | 0.050 | 0.048 | 0.037 |
| 40 | | 0.066 | 0.069 | 0.062 | 0.064 | 0.050 | 0.054 |
| 60 | 0.040 | 0.052 | 0.059 | 0.060 | 0.061 | 0.042 | 0.051 |
| 80 | 0.043 | 0.058 | 0.062 | 0.056 | 0.057 | 0.051 | 0.053 |
| 100 | 0.062 | 0.077 | 0.084 | 0.069 | 0.070 | 0.071 | 0.068 |
| 120 | 0.077 | 0.089 | 0.103 | 0.091 | 0.089 | 0.091 | 0.088 |
| 140 | 0.075 | 0.090 | 0.109 | 0.097 | 0.091 | 0.092 | 0.091 |
| 160 | 0.073 | 0.089 | 0.105 | 0.099 | 0.085 | 0.090 | 0.090 |

Example 2

According to the Invention

The fines (<300 μm) and the coarse material (>1250 μm) are separated off from a commercial PBI polymer (Celazole) by sieving. This polymer is then dried and a solution is prepared. A film is produced from the solution using conventional methods.

The film is subsequently doped in 85% phosphoric acid for 72 hours so as to produce a membrane.

Figure 3:
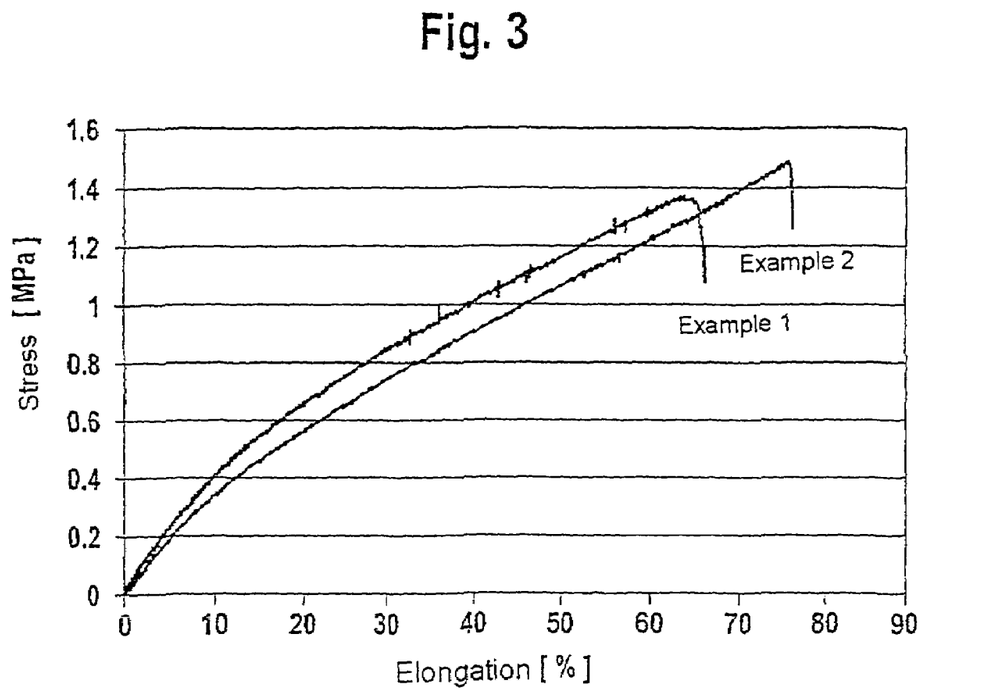
FIG. 3 is a plot showing a comparison of mechanical properties of the best membrane produced according to Example 1 and the membranes produced according to Example 2.

As shown by the comparison in FIG. 3, it is found that the mechanical properties of such a membrane are virtually identical to those of the best membrane from example 1. A maximum conductivity of 0.09 S/cm is likewise measured at a temperature of 120°

The invention claimed is:

1. A polymer film based on polyazoles which is obtainable by a process comprising steps
   A) dissolving the polyazole polymer in polar, aprotic organic solvent,
   B) casting a polymer film using the solution obtained from Step A),
   C) drying the film formed in step B) until it is self-supporting,
   wherein a polyazole polymer powder having a particle size in the range from 300 μm to 1000 μm is used in step A), and wherein the polymer film displays a fracture toughness of greater than 2300 kJ/m².

2. A polymer film as claimed in claim 1, wherein the polyazole-based polymer used is a polymer comprising recurring azole units of the formula (I) and/or (II)

where
   Ar are identical or different and are each a tetravalent aromatic or heteroaromatic group which can be monocyclic or polycyclic,
   $Ar^1$ are identical or different and are each a divalent aromatic or heteroaromatic group which can be monocyclic or polycyclic,
   $Ar^2$ are identical or different and are each a trivalent aromatic or heteroaromatic group which can be monocyclic or polycyclic,
   X are identical or different and are each oxygen, sulfur or an amino group bearing a hydrogen atom, a group having 1-20 carbon atoms, preferably a branched or unbranched alkyl or alkoxy group, or an aryl group as further radical.

3. A polymer film as claimed in claim 2, wherein the polyazole-based polymer used is a polymer comprising recurring benzimidazole units of the formula (III)

wherein n is an integer greater than or equal to 10.

4. A polymer film as claimed in claim 1, wherein drying of the film in step C) is carried out at temperatures in the range from room temperature to 300° C.

5. A polymer film as claimed in claim 1, wherein drying of the film in step C) is carried out for a period of from 10 seconds to 24 hours.

6. The polymer film of claim 1, wherein the process further includes a step of doping the polymer film obtained in step C) with a dopant.

7. A polymer membrane as claimed in claim 6, wherein the polyazole-based polymer used is a polymer comprising recurring azole units of the formula (I) and/or (II)

where
- Ar are identical or different and are each a tetravalent aromatic or heteroaromatic group which can be monocyclic or polycyclic,
- $Ar^1$ are identical or different and are each a divalent aromatic or heteroaromatic group which can be monocyclic or polycyclic,
- $Ar^2$ are identical or different and are each a trivalent aromatic or heteroaromatic group which can be monocyclic or polycyclic,
- X are identical or different and are each oxygen, sulfur or an amino group bearing a hydrogen atom, a group having 1-20 carbon atoms, preferably a branched or unbranched alkyl or alkoxy group, or an aryl group as further radical.

8. A polymer membrane as claimed in claim 6, wherein the polyazole-based polymer used is a polymer comprising recurring benzimidazole units of the formula (III)

where n is an integer greater than or equal to 10.

9. A polymer membrane as claimed in claim 6, wherein drying of the film in step C) is carried out at temperatures in the range from room temperature to 300° C.

10. A polymer membrane as claimed in claim 6, wherein drying of the film in step C) is carried out for a period of from 10 seconds to 24 hours.

11. A polymer membrane as claimed in claim 6, wherein doping is carried out for a period of from 5 minutes to 96 hours.

12. A polymer membrane as claimed in claim 6, wherein the degree of doping is from 3 to 15 mol of acid per mol of repeating units of the polymer.

13. A polymer membrane as claimed in claim 6, wherein the dopant used is sulfuric acid or phosphoric acid.

14. A membrane-electrode unit comprising at least one polymer membrane as claimed in claim 6 and at least one electrode.

15. A polymer electrolyte fuel cell comprising at least one membrane-electrode unit as claimed in claim 14.

16. A polymer film of claim 1, wherein a polyazole polymer powder having a particle size in the range from 500 µm to 1000 µm is used in step A).

17. A polymer film of claim 1, wherein a polyazole polymer powder having a particle size in the range from 750 µm to 1000 µm is used in step A).

* * * * *